(12) United States Patent
Schindler et al.

(10) Patent No.: US 8,186,153 B2
(45) Date of Patent: May 29, 2012

(54) ENGINE COMPARTMENT ARRANGEMENT FOR CLEANING DIESEL PARTICULATE FILTER

(75) Inventors: Rodney Allen Schindler, Eldridge, IA (US); Alan David Sheidler, Moline, IL (US); Kyle Jacob Brenner, Silvis, IL (US)

(73) Assignee: Deere & Company, Moline, IL (US)

( * ) Notice: Subject to any disclaimer, the term of this patent is extended or adjusted under 35 U.S.C. 154(b) by 469 days.

(21) Appl. No.: 12/434,022

(22) Filed: May 1, 2009

(65) Prior Publication Data

US 2010/0275587 A1 Nov. 4, 2010

(51) Int. Cl.
*F01N 3/02* (2006.01)

(52) U.S. Cl. ............... 60/311; 60/289; 60/295; 60/298; 60/320; 60/324; 55/282.2; 55/383; 55/385.2; 95/20; 95/280; 180/68.2; 180/68.4

(58) Field of Classification Search ............ 60/274, 60/289, 295, 298, 307, 311, 317, 320, 324; 55/282.2, 383, 385.2; 95/20, 280; 180/68.1, 180/68.2, 68.4
See application file for complete search history.

(56) References Cited

U.S. PATENT DOCUMENTS

| | | | | |
|---|---|---|---|---|
| 4,086,976 A | * | 5/1978 | Holm et al. | 180/68.1 |
| 4,706,454 A | * | 11/1987 | Smith, Jr. | 60/274 |
| 5,704,643 A | * | 1/1998 | Yamanaka et al. | 280/781 |
| 6,481,222 B1 | * | 11/2002 | Denniston | 62/94 |
| 6,655,486 B2 | * | 12/2003 | Oshikawa et al. | 180/68.1 |
| 7,849,680 B2 | * | 12/2010 | Shaff et al. | 60/295 |
| 7,861,822 B2 | * | 1/2011 | Redmann | 181/204 |

FOREIGN PATENT DOCUMENTS

| | | |
|---|---|---|
| JP | 55180920 U1 | 12/1980 |
| JP | 2010063417 A | 3/2010 |

OTHER PUBLICATIONS

European Search Report dated Oct. 5, 2010, (5 pages).

* cited by examiner

*Primary Examiner* — Binh Q Tran

(57) ABSTRACT

An engine compartment arrangement for an agricultural harvester comprises an engine (10), a diesel particulate filter (12) coupled to the engine (10) to receive and filter hot exhaust gases therefrom, a fan (14), a radiator (16) disposed in a cooling airflow path in front of the fan (14) and coupled to the engine (10) to cool said engine (10), a cleaning air duct (18) having a first end (20) disposed immediately behind the fan (14) to receive a portion of the air ejected from the fan (14), and having a second end (22) disposed adjacent to the top of the diesel particulate filter (12) to exhaust a jet of the ejected air at a sufficient speed and in sufficient volume across the top surface (24) of the diesel particular filter (12) to prevent an accumulation of agricultural debris on top of the diesel particulate filter (12).

5 Claims, 2 Drawing Sheets

ENGINE COMPARTMENT ARRANGEMENT FOR CLEANING DIESEL PARTICULATE FILTER

FIELD OF THE INVENTION

The invention relates to agricultural equipment. More particularly, it relates to agricultural harvesters. Even more particularly it relates to systems and methods for cleaning engine compartments.

BACKGROUND OF THE INVENTION

The Environmental Protection Agency of the United States in America has established certain standards for energy efficiency and exhaust gas cleanliness. The most recent version of these standards is called "Tier 4".

A device that has been proposed to meet these standards is what is called a "diesel particulate filter". Diesel particulate filters filter diesel exhaust gas and remove microscopic particles of debris from that gas. Diesel particulate filters need to be periodically regenerated, preferably by temporarily elevating the temperature of the exhaust gas to temperatures approaching 600° C. At these temperatures, cellulose dust and other combustible debris will instantly incinerate.

The incineration of a small amount of debris typically found in engine compartments of over-the-road vehicles does not pose a problem. In other environments, such as off-road and agricultural operating environments, the risk may be greater.

Agricultural harvesting typically occurs in fields of dry crop. The basic function of an agricultural harvester is to cut down dry crop plants, shred them, separate seeds from the undesirable portions of the plant, and blow the unwanted plant material out the back of the harvester, spreading it over the ground where it can nourish the soil.

Harvesting typically occurs in blustery, gusting, and windy conditions. Under these conditions, a significant portion of the unwanted crop material is levitated and pulled into the engine compartment. This levitated unwanted crop material varies in size from dust particles to entire leaves of the plant, and over time it will coat the entire engine compartment. This coating occurs in spite of the traditional air flows through the engine that are generated by cooling fans, for example.

The diffuse air flows generated by cooling fans lack the velocity to keep the unwanted crop material from settling on cool components in the engine compartment and building up in a thick layer.

Hot components, such as mufflers and exhaust pipes do not pose a problem, since the unwanted crop material never builds up on them. To the extent the muffler is hot enough to incinerate unwanted crop material, that material (typically dust or fine leaf particles) is carbonized as soon as it touches the muffler and never builds up in sufficient volume to catch on fire.

The particular problem posed by diesel particulate filters is due to their intermittent operation: long periods of relatively low temperature (during normal operation) interspersed with short periods of extremely high temperatures (during the regeneration cycle).

During the long periods of normal operation in which the diesel particulate filter is relatively cold, unwanted crop material can build up on the outside surface of the filter. When the regeneration cycle begins and the diesel particulate filter becomes extremely hot, this now-thick layer of unwanted crop material may combust.

One solution to this problem is to surround diesel particulate filters with a thick insulating layer. If it is thick enough, the outside layer of the insulation will never reach an incinerating temperature. Added layers of insulation, however, increase the size and the cost of diesel particulate filters as well as make the diesel particulate filters difficult to fit into engine compartments with closely packed components.

Another solution is to intermittently remove accumulated unwanted plant material from the surface of the diesel particulate filter prior to its regeneration cycle, for example by providing a mechanical member to wipe the surface of the diesel particulate filter, or a separate blower that can be periodically energized to blow the accumulated unwanted crop material off the surface of the diesel particulate filter prior to its regeneration cycle. Unfortunately this also adds significant cost of the vehicle. They require the addition of a high power fan capable of blowing a layer of accumulated unwanted crop material off the diesel particulate filter and intelligent electronic control circuitry to turn the fan on and off at the appropriate times.

What is needed, therefore, is an engine compartment arrangement for an agricultural Harvester that will prevent the accumulation of combustible plant material on a diesel particular filter.

It is an object of this invention to provide such an engine compartment arrangement.

SUMMARY OF THE INVENTION

An engine compartment arrangement for an agricultural harvester has an engine (10); a diesel particulate filter (24); a fan (14); a radiator (16); and a cleaning air duct (18).

The inlet to the cleaning air duct is located behind the fan to channel a portion of the air exhausted by the fan toward the top surface of the diesel particulate filter. The outlet of the cleaning air duct is located adjacent to the top surface of the diesel particulate filter to direct the flow of air across the top surface of the diesel particulate filter.

The cleaning air duct is dimensioned sufficient to ensure that particulate matter does not accumulate on top of the air duct. The cleaning air duct is a passive device, requiring no electronic or other controls, nor the provision of an additional fan to supply the flow of air. Its function is to receive a flow of high velocity/high-pressure air in a region adjacent to the outlet of the fan, before the airflow generated by the fan can diffuse through the engine department and lose its velocity and pressure.

By locating the inlet near the outlet of the fan, a portion of the fan's air can be separated and directed across the diesel particulate filter with sufficient velocity and pressure to keep the dust accumulating surfaces of the diesel particulate filter clean at all times and to prevent the accumulation of a layer thick enough to be a combustion hazard.

The jet of air is not intended to keep the diesel particulate filter cool during its regeneration phase, but to keep the diesel particulate filter clean. In fact the jet of air provided by the cleaning air duct may be insufficient to cool the diesel particulate filter to a below-combustion temperature.

To maintain the velocity of the air that is directed across the diesel particulate filter, the outlet of the cleaning air duct may be configured to direct airflow into a plane that is parallel to or coplanar with the dust accumulating surfaces of the diesel particulate filter. For example, the cleaning air duct can spread the jet of air into a planar shape by which substantially all the top surface of the digital particulate filter is swept clean.

To provide a high velocity at the outlet of the cleaning air duct, the outlet of the cleaning air duct may have a smaller cross-sectional area than the inlet of the cleaning air duct.

A beneficial feature of the engine compartment arrangement is that an existing flow of air is directed across an upper or top surface of the diesel particulate filter while the diesel particulate filter is not being regenerated to prevent the creation of a layer of combustible material. This flow of air is formed into a jet that is generally planar and extends in a direction parallel to the top surface of the diesel particulate filter to clean the entire top surface.

DETAILED DESCRIPTION OF THE INVENTIONS

Figure 1:
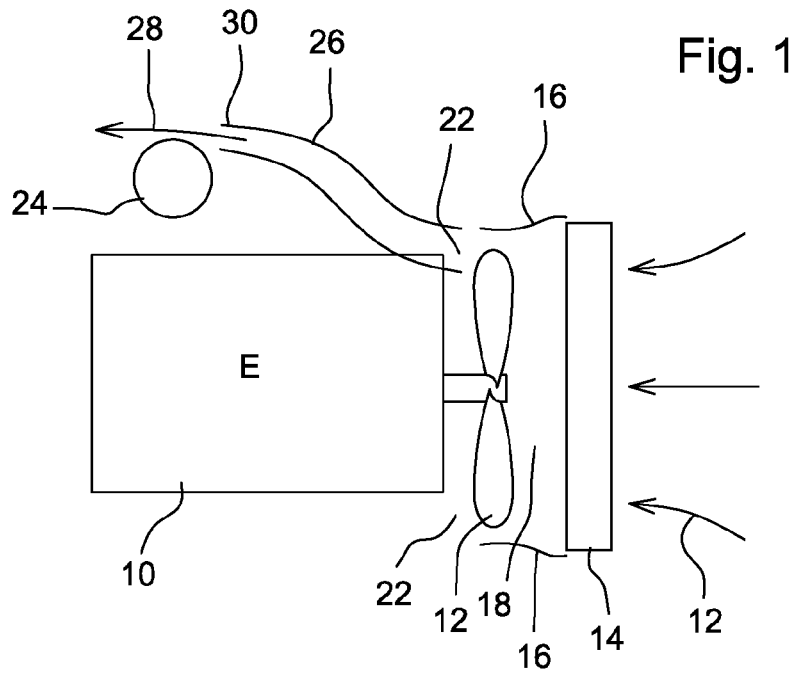
FIG. 1 is a schematic view of the engine compartment arrangement.

In FIG. 1, an engine compartment arrangement includes an engine 10, which drives a fan 12, disposed behind a radiator 14. Fan 12 and radiator 14 are surrounded by a fan shroud 16 that limits the entry of air into the space between the fan and the radiator. Fan 12 spins whenever the engine is operating. Fan 12 creates a region 18 of low pressure behind the radiator, which causes air 20 to flow into and through the radiator. Fan 12 also creates a region of high pressure 22 immediately downstream from the fan in the airflow path that the fan generates. This region of high pressure 22 is also a region of high air velocity.

Substantially all of the air leaving the outlet of the fan (region 22) spreads outward to flow around the outside of the engine. This enlargement of the airflow path causes the velocity and pressure of the air to drop. Thus, by the time the air passes diesel particulate filter 24, it does not have sufficient velocity to remove any material resting on top of the diesel particulate filter or prevent material from accumulating.

The air velocity is so low at this point that (were it not for the cleaning air duct) the top surface of the diesel particulate filter 24 will gradually collect combustible dust and other unwanted crop material on its top surface.

To prevent this from happening, the engine compartment arrangement also includes a cleaning air duct 26 disposed to gather high velocity, high-pressure air adjacent to the fan 12 outlet and direct that air across the top surface of the diesel particulate filter 24.

Figure 2:
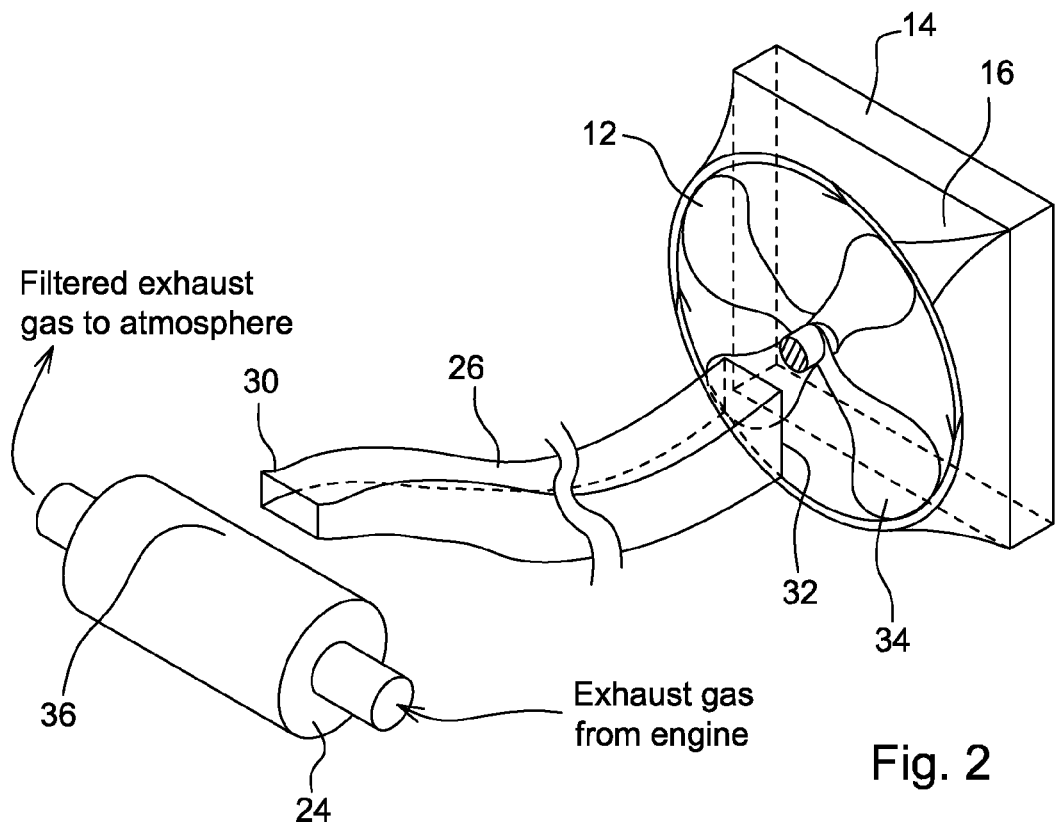
FIG. 2 is a close-up view of the engine compartment arrangement of FIG. 1.

FIG. 2 illustrates the configuration of a preferred cleaning air duct 26 in accordance with the present invention. Cleaning air duct 26 has an inlet 32 disposed at one end of the cleaning air duct 26 and an outlet 30 disposed at the other end of the cleaning air duct 26. Inlet 32 is disposed immediately adjacent to and downstream of the blades 34 of fan 12. The cross-sectional area of outlet 30 is less than the cross-sectional area of inlet 32. Outlet 30 is flattened to define an oval or flat opening such that the jet of air generated by outlet 30 is in a plane that is generally parallel to the top surface 36 of diesel particulate filter 24.

Figure 3:
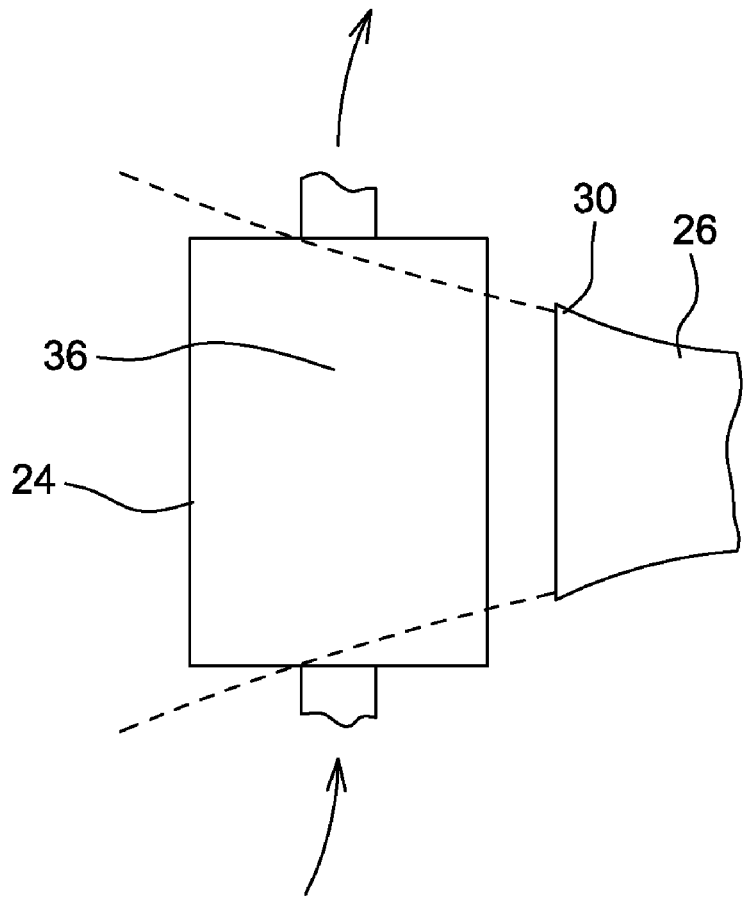
FIG. 3 is a top view of the diesel particulate filter and the outlet of a cleaning air duct of FIGS. 1, 2.
Figure 4:
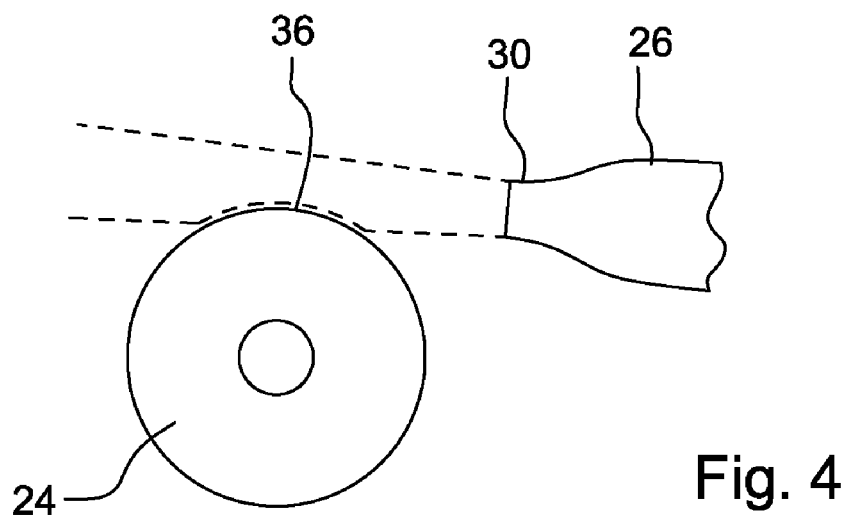
FIG. 4 is an end view of the diesel particulate filter and the outlet of the cleaning air duct of FIG. 3.

FIGS. 3 and 4 show top and end views of outlet 30 with respect to diesel particulate filter 24. In these figures, the outer contours of the air jet is indicated in dashed lines that extend from outlet 30, across the top of diesel particulate filter 24, and away from diesel particulate filter 24. Note that the air jet contacts the top surface 30 of diesel particulate filter 24. The air jet also extends across substantially all of top surface 36 to clean the entire top surface. Providing a jet with a width in a direction normal to the top surface 36 (see FIG. 4) that is thinner than the width of direction parallel to the top surface 36 (see FIG. 3) keeps the velocity of the air jet higher and hence the dust scouring capacity greater than it would be if the outlet was round or square.

The invention claimed is:

1. An engine compartment arrangement for an agricultural harvester comprising an engine (10); a diesel particulate filter (12) coupled to the engine (10) to receive and filter hot exhaust gases therefrom, the diesel particulate filter being configured for periodic high temperature regeneration; a fan (14); a radiator (16) disposed in a cooling airflow path in front of the fan (14) and coupled to the engine (10) to cool said engine (10); and a cleaning air duct (18) having a first end (20) disposed at an outlet of the fan (14) to receive a portion of the air ejected from the fan (14), and having a second end (22) disposed adjacent to the top of the diesel particulate filter (12) to exhaust a jet of the ejected air at a sufficient speed and in sufficient volume across the top surface (24) of the diesel particular filter (12) to prevent an accumulation of agricultural debris on top of the diesel particulate filter (12).

2. The engine compartment arrangement of claim 1, in which the jet of the ejected air is insufficient to cool the diesel particulate filter (12) to a temperature that is below a temperature sufficient to combust accumulated agricultural debris.

3. The engine compartment arrangement of claim 2, in which the second end (22) of the cleaning air duct is configured to spread the jet of the ejected air into a planar shape by which substantially all the top surface (24) of the digital particulate filter (12) is swept clean.

4. The engine compartment arrangement of claim 1, in which the cleaning air duct (18) is plastic.

5. The engine compartment arrangement of claim 1, wherein the second end (22) of the cleaning air duct (18) has a smaller cross-sectional area than the first end (20) of the cleaning air duct (18).

\* \* \* \* \*